Patented Aug. 10, 1943

2,326,275

UNITED STATES PATENT OFFICE 2,326,275

PROCESS FOR THE PREPARATION OF CATALYSTS FOR HYDROGENATION

Joseph Zeltner, Paris, France; vested in the Alien Property Custodian

No Drawing. Application April 1, 1939, Serial No. 265,605. In France April 11, 1938

9 Claims. (Cl. 252—259)

It is well known that catalysts for the hydrogenation of certain organic compounds can be prepared if an alloy of certain metals is decomposed by the action of neutral or alkaline substances attacking only one of the alloyed metals.

The present invention has for its object a process for the preparation of catalysts for hydrogenation, and is particularly applicable to nickel catalysts. The said invention consists, for example, in treating an alloy of nickel and a more electropositive element, such as magnesium or calcium, with a weak or dilute organic acid, the said acid being used in such proportions as to correspond at least to all the magnesium or other electropositive metals contained in the alloy. The treatment can be carried out hot or cold. The alloy can be subjected to the treatment in the form of lumps, shavings, etc., but it is preferable to treat it in the powdered form.

All acids of the kind stated which do not attack the nickel but which are capable of dissolving the more electro-positive metals, may be used. The inventor has achieved particularly favourable results when using acetic acid to attack a magnesium-nickel alloy.

The inventor has moreover discovered that the action of the said weak or dilute organic acid is facilitated if the alloy is previously treated with boiling water or a neutral or saline solution.

By way of example, a useful nickel catalyst, giving excellent results in the hydrogenation of many unsaturated organic compounds, may be prepared as follows. An alloy containing 55% of nickel and 45% of magnesium is finely powdered and then treated with boiling water or a solution of the salt of a strongly electro-positive metal, provided the salt exhibits no tendency to poison the catalyst subsequently. The alloy is next treated with a 20% solution of acetic acid in water. The catalyst and the solution are mixed in small portions until there is no more evolution of hydrogen. The solution of magnesium acetate so obtained is decanted, and the undissolved nickel is washed with water. It can then be kept under suitable conditions for long periods without its catalytic properties being impaired. For example alcohol forms an excellent medium for its preservation.

A nickel catalyst so prepared is extremely active.

In the preparation of nickel catalysts according to the said invention, the use of acetic acid as described in the above example may be replaced by any other weak or dilute organic acid capable of dissolving the magnesium or other electro-positive metal, but having only a slight action on the nickel constituent, or none at all. Thus propionic acid forms an excellent substitute for acetic acid in the case of nickel-magnesium alloys.

Similarly the nickel in the alloy may be replaced by any other metal which is attacked only slightly or not at all by the weak or dilute organic acid employed, provided always that the metal in question so treated forms a useful catalyst for hydrogenation.

Similarly, the process is equally applicable to a mixture of metals, either electropositive and capable of being attacked by a weak or dilute acid, or resisting attack by the said acids and capable of serving as catalysts. Thus, instead of magnesium or calcium, one can employ a mixture of these two metals, or indeed any alkali or alkaline earth-metals, either alone or together. One can also prepare, according to the said invention, by attacking with weak or dilute organic acids an alloy of the metals to serve as catalysts with more electropositive metals, a mixture of catalysts, such as a catalytic mixture of nickel and iron.

In the appended claims, the expression "mild organic acid" will be used to cover organic acids that are (when undiluted or substantially undiluted) weak in their action on metals like magnesium (i. e. organic acids that act only relatively slowly on magnesium) and organic acids which are diluted with water (e. g. the 20% solution of acetic acid mentioned above). Such "mild organic acids" acting upon magnesium-nickel alloy, will give nickel which is more highly catalytically active than would be produced by acting upon the alloy with concentrated acetic acid or with concentrated or dilute mineral acid. No claim is made herein, to the use of mineral acid for dissolving the alkaline earth metal or magnesium.

The said invention also covers, as new industrial products, all active catalysts for hydrogenation prepared as hereinbefore described.

I claim:

1. A process for preparing a metal catalyst which comprises treating an alloy which consists essentially of nickel with metal of the group consisting of alkaline earth metals and magnesium, with a mild organic acid, which can dissolve the metal of said group, enough of said acid being used to dissolve the metal of said group present, and separating the undissolved nickel from the salt solution produced.

2. A process for preparing a metal catalyst which comprises treating an alloy of nickel with an alkaline earth metal, with a mild organic acid, the acid used being an acid of which the alkaline earth metal salt is soluble in water and in dilute acids, continuing the said treatment until the said alkaline earth metal is dissolved as a salt and separating the salt solution and undissolved nickel from each other.

3. A process for preparing a metal catalyst which comprises treating an alloy of nickel with magnesium, with a mild organic acid, in amount capable of dissolving the magnesium as a salt, and separating the salt and the undissolved nickel from each other.

4. A process for preparing a metal catalyst which comprises treating an alloy which consists essentially of nickel with metal of the group consisting of alkaline earth metals and magnesium, with dilute acetic acid of not substantially above 20% strength.

5. A process for preparing a metal catalyst which comprises treating an alloy consisting essentially of nickel with a more strongly electropositive metal which is readily dissolved by organic acids even when in the diluted condition, with a mild organic acid, the acid used being one that forms a water soluble salt with the more electropositive metal in said alloy, continuing said treatment until the said electropositive metal is dissolved as a salt, and separating said salt and the undissolved nickel from each other.

6. Process according to claim 3 in which the alloy contains about 55% of nickel and about 45% of magnesium and is in the powdered form.

7. Process for the preparation of metallic catalyst for hydrogenation containing nickel in which the more electro-positive portion of a previously prepared alloy of nickel with a metal which is considerably more electro-positive than nickel is attacked and dissolved by acetic acid of 20% and separating the acetate solution so formed from the metallic nickel.

8. Process according to claim 1 in which the alloy is treated by water prior to being attacked by acid.

9. Process according to claim 1 in which the alloy is boiled in an aqueous saline solution prior to being attacked by acid, said saline solution being free from substances which would be capable of poisoning the nickel catalyst.

JOSEPH ZELTNER.